United States Patent [19]
Raymond

[11] Patent Number: 5,123,140
[45] Date of Patent: Jun. 23, 1992

[54] AIR DEFLECTOR FOR A WINDSHIELD WIPER WITH A RESILIENT BUFFER TO PREVENT ABRASION

[75] Inventor: Guy Raymond, Roissey-en-Brie, France

[73] Assignee: Valeo Systemes D'Essuyage, Montigny-le-Bretonneux, France

[21] Appl. No.: 537,932

[22] Filed: Jun. 13, 1990

[30] Foreign Application Priority Data

Jun. 15, 1989 [FR] France ................. 89 07967

[51] Int. Cl.⁵ ........................................ B60S 1/04
[52] U.S. Cl. ............................ 15/250.42; 15/250.36
[58] Field of Search .......... 15/250.20, 250.42, 250.36, 15/350.35, 250.31

[56] References Cited

U.S. PATENT DOCUMENTS 4,561,143 12/1985 Beneteau ................. 15/250.42

FOREIGN PATENT DOCUMENTS 0199558 9/1987 Japan ................. 15/250.42

Primary Examiner—Harvey C. Hornsby
Assistant Examiner—Gary K. Graham
Attorney, Agent, or Firm—Dennison, Meserole, Pollack & Scheiner

[57] ABSTRACT

An air deflector for a windshield wiper blade includes a profiled portion and attachment means for attaching it to either a wiper blade or a wiper arm carrying the wiper blade.

At least one resiliently deformable annular cushioning element is provided on the deflector.

The invention is especially applicable to automotive vehicles.

10 Claims, 2 Drawing Sheets

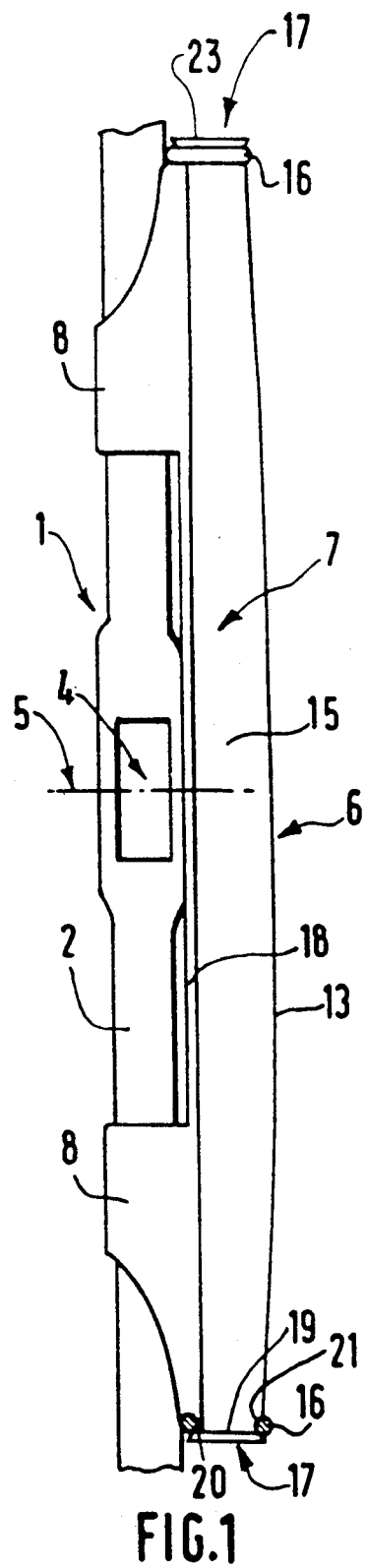
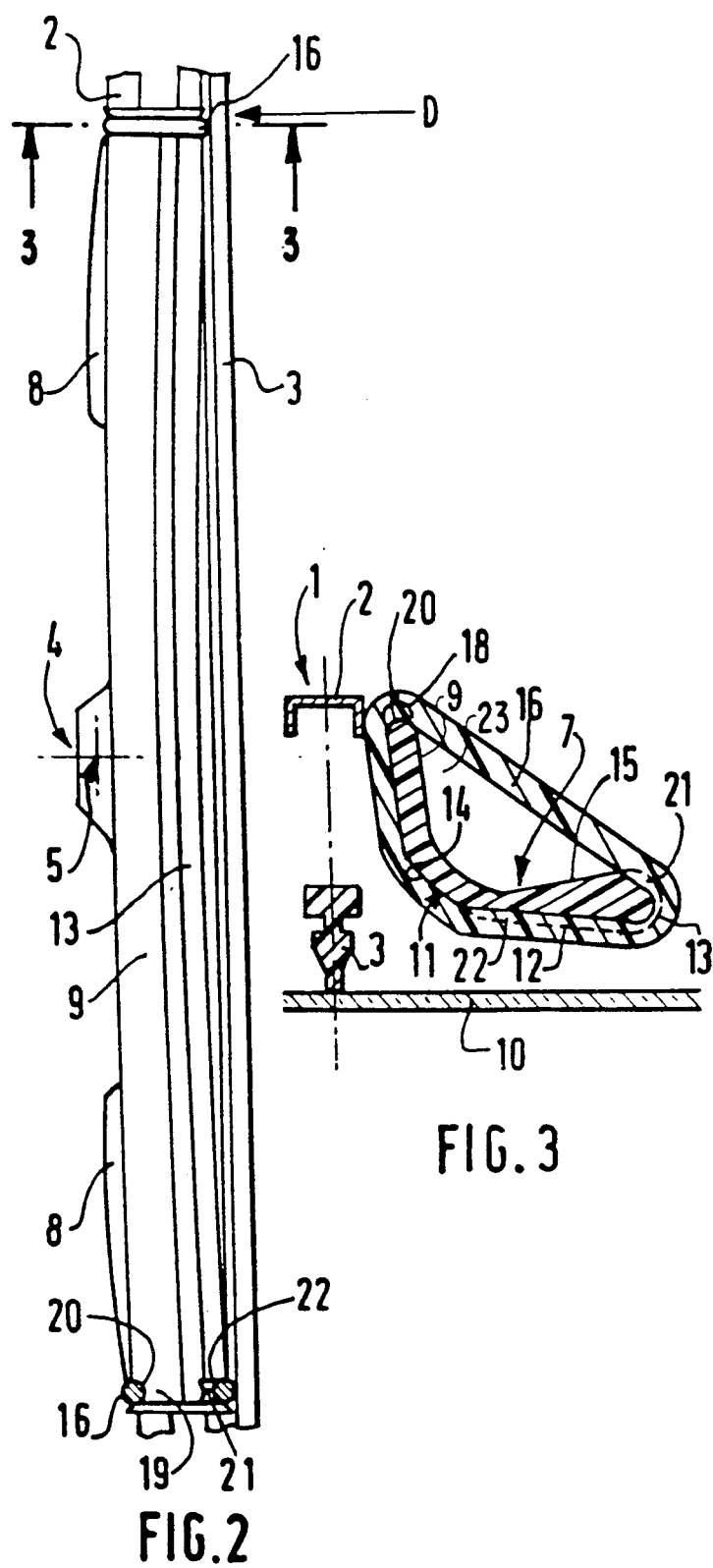
FIG.1   FIG.2   FIG.3

AIR DEFLECTOR FOR A WINDSHIELD WIPER WITH A RESILIENT BUFFER TO PREVENT ABRASION

FIELD OF THE INVENTION

The present invention relates to an air deflector for a windshield wiper apparatus, in particular for an automotive vehicle.

BACKGROUND OF THE INVENTION

The use of an air deflector which is able to be fixed either to a windshield wiper blade, or to a wiper arm carrying such a blade, is necessary in order to prevent disengagement of the blade from the glass which is being swept. Such disengagement is caused by aerodynamic forces set up by air flows impinging on the wiper blade, when the vehicle which carries the windshield wiper assembly comprising the blade and its arm is travelling at high speed while the wiper is operating.

Such a deflector should have its free edge directed towards the swept surface, typically the windshield of the vehicle, and it should also be as close to this surface as possible so as to reduce to a minimum the space between the swept surface and that edge of the deflector. This is because it is necessary to prevent air flows being able to force their way into this space in such a way as to tend to set up an aerodynamic force on the back face of the deflector, which would then cause the wiper to lift away from the surface. However, such proximity is limited, partly by the curvature of the windshield and partly by the risk of contact of the free edge of the air deflector with the windshield itself, which can cause damage to the swept surface of the latter, with eventual detriment to good visibility by the driver. It has been proposed, in particular in the published patent application No. DE 3 637 348A of the Federal Republic of Germany, to make the free edge of an air deflector in a material which is substantially softer than the rest of the deflector. This arrangement necessitates the manufacture of a deflector in two materials, with difficulties then arising of joining these two materials together. In addition, when the wiper is in operation, and due to the curvature of the windshield, the deflector runs the risk of assuming a position such that its softer free edge no longer lies facing towards the swept surface, so that it is in fact the harder part which is in danger of coming into contact with the swept surface.

DISCUSSION OF THE INVENTION

An object of the present invention is to overcome the disadvantages mentioned above, by proposing an air deflector which does not run the risk of damaging the swept surface, regardless of its position during the sweeping movement of the wiper.

In accordance with the invention, an air deflector for a windshield wiper blade, in particular for an automotive vehicle, the said deflector having a profiled portion and attachment means for attaching the deflector on the wiper blade or on a wiper arm carrying the said blade, is characterized in that at least one resiliently deformable cushioning element (referred to herein, for convenience and without limitation, as a pad) embraces all or part of the deflector.

As a result of this arrangement, the pad, because of its resilient nature and its physical disposition, is able to come into contact with the swept surface without damaging the latter.

In accordance with a preferred feature of the invention, the pad extends in a direction which is orthogonal to the longitudinal direction of the deflector.

In accordance with a further feature of the invention, the pad is annular in shape.

The pad can thus, firstly, be positioned as required on the deflector while having maximum effect, and secondly ensure protection of the swept surface in the event of contact with the deflector, regardless of the position of the latter with respect to the swept surface.

In the case where an air deflector includes connecting means between the profiled portion and the attachment means, a further preferred feature of the invention lies in that the annular pad embraces both the connecting means and the profiled portion. This enables the fitting of the annular pad on the deflector to be relatively simple, in the sense that the latter only surrounds the deflector by being carried by the latter.

The other features and advantages of the invention will appear more clearly from the description which follows, which is given by way of example only and with reference to the accompanying drawings.

BRIEF DESCRIPTION OF THE DRAWINGS

FIG. 1 is a front view of a deflector according to the invention.

FIG. 2 is a view as seen from the right of FIG. 1.

FIG. 3 is a view in partial cross section taken on the line 3—3 in FIG. 2.

DESCRIPTION OF PREFERRED EMBODIMENTS OF THE INVENTION

Figure 4:
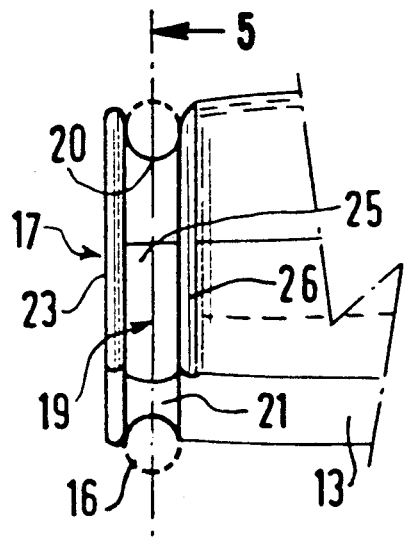
FIG. 4 shows a first variant on the detail D in FIG. 2.

Referring first to FIGS. 1 and 2, a windshield wiper blade 1 comprises, generally, an armature 2 arranged to support a wiping strip 3. The armature 2 preferably has a transverse cross sectional profile in the form of a reversed U, and includes in its middle part an opening 4 which is formed in the base of the U shaped channel. A pivot pin 5 passes through this middle part of the armature. The pivot pin 5 is adapted to be engaged in a mounting element at one end of a windshield wiper arm (not shown) to provide a pivot connection between the wiper arm and the armature 2.

The wiper 1 is equipped with an air deflector 6, which in this example is carried by the blade itself, though it could be carried by the wiper arm without departing from the scope of this invention. Similarly, although the rest of this description is directed to one particular type of air deflector, the invention is applicable to any other type of deflector. The particular type of deflector on which this description of examples of the invention is based is disclosed in greater detail in French patent application No. 87 13770 filed on Oct. 6th, 1987, and will not be described further here except in general terms.

Referring now in addition to FIG. 3, the deflector 6 has a profiled portion 7, attachment means 8, in this example for attaching it directly to the armature 2 of the blade 1, and connecting means 9 for joining the profiled portion 7 to the attachment means 8. The connecting means 9 extend towards the surface 10 to be swept, which is typically the front face of the windshield of an automotive vehicle.

The profiled portion 7 is substantially convex in shape, with its convexity towards the swept surface 10. This profiled portion 7 includes on its inner surface 11 a first zone 12 which is substantially flat and which is inclined at a predetermined angle with respect to the swept surface 10 so as to extend away from the latter from a front edge 13 of the deflector towards the rear, that is to say towards the blade 1. This front edge 13 is rounded in a substantially semi-cylindrical form.

A second zone 14 follows the first zone 12, making an angle with respect to the swept surface 10 greater than the angle between the latter and the first zone 12, such that the internal surface 11 of the profiled portion 7 has a dihedral type profile which is convex towards the swept surface 10. The outer surface 15 of the profiled portion 7 is in the form of a concave dihedral, and the thickness of the portion 7 diminishes progressively from the front edge 13 towards the blade 1. The profiled portion 7 is spaced away from the swept surface 10 in the manner which is more fully described in the specification of the French patent application cited above.

The connecting means 9 in this example comprise a continuous web which connects the inner end of the profiled portion 7, defined by the zone 14, to the attachment means 8. The web 9 extends along the full length of the profiled portion 7, carrying the attachment means 8 as is best seen in FIG. 1. Preferably, the profiled portion 7, the web constituting the connecting means 9, and the attachment means 8, are all formed integrally with each other in a plastics material.

In order to limit any eventual damage to the swept surface 10 by contact of the profiled portion 7 with that surface, the air deflector includes at least one resiliently deformable, annular cushioning element or pad 16, which projects outwardly from the deflector. In this example there are two of these pads, each of which is arranged close to a respective one of the free ends 17 of the deflector 6 and extends in a direction which is orthogonal to the longitudinal direction of the deflector 6. By way of example, and as shown, this pad 16 is a simple elastic ring, circular in cross section commonly known as an O-ring.

In a modification within the scope of the invention, the pad 16 may extend along the deflector, being then carried by the flat zone 12 of the profiled portion 7 of the latter and being arranged close to the outer edge 13. Such a pad may be linear in shape. Alternatively it may be in the form of a ring extending along the outer surface 15 lying opposite to the flat zone 12, as well as along the zone 12. In another alternative arrangement, the pad 16 may extend in the direction previously described, again having a linear shape but lying on the inner surface 11 of the profiled portion 7.

As is best seen in FIG. 3, the pad 16 in the form of a resilient ring surrounds the deflector 6, partly or wholly. In this example it completely surrounds the deflector 6, engaging successively on the rounded edge 13, the inner surface 11 of the profiled portion 7, the inner surface of the web 9 constituting the connecting means, and the free edge 18 of this web.

It will however be clear that further modifications may be made within the scope of the invention. For example, the pad 16 may surround only the profiled portion 7 which, as mentioned in the specification of the French patent application mentioned above, may include connecting legs spaced from each other in place of the web 9, so as to create a free space between the connecting legs. This space defines an inner edge of the profiled portion directed towards the wiper blade. In that case, the pad 16 may bear successively on the outer edge 13, the inner surface 11 of the profiled portion 7, the inner edge thus formed, and the outer surface 15 of the profiled portion.

The pad 16 is preferably held in place within a support element 19 which is provided close to the end 17 of the deflector 6. The support element 19 consists of at least one semi-cylindrical groove carried by some or all of those surfaces which are adapted to support the pad 16, such that one half of the cross section of the pad 16 is supported while the other half is free. The latter half then projects from the surface concerned.

In FIG. 3, the support element 19 consists of a first groove 20 which is provided on the free edge 18 of the web 9 defining the connecting means, a second groove 21 formed on the rounded outer edge 13, and a third groove 22 formed on the inner surface of the profiled portion 7, in this example the flat zone 12 described above. All these grooves lie in a common plane. A web 23 is provided at the free end 17 and close to the outer edges of the grooves 20 and 21. This web is substantially trapezium shaped, the shorter base line of the trapezium lying on the outer surface 15 and more particularly on the outer surface of the zone 14 (FIG. 3). The larger base line of the trapezium joins the free edges 13 and 18 of the deflector, while the non-parallel sides of the trapezium are defined respectively by the outer surface 15 of the first zone 12 and the outer surface of the connecting web 9, being disposed orthogonally to the longitudinal direction of the deflector 6. The pad 16 is thus not only held immobile by the succession of grooves 20 to 22, but is also protected against possible accidents in handling by the web 23, which prevents any penetration of foreign bodies through the free end 17. The resiliently deformable annular pad 16 may be separate from the deflector 6, or it may be formed on the deflector itself by moulding. In both cases the pad is always of a softer material than the deflector 6.

In the remainder of this description, the annular pad 16 is regarded as an element which is adapted to be carried on the deflector 6. Thus, before being fitted, the annular pad 16 is in the form of a substantially cylindrical torus which, during the engagement of the pad by the end 17 of the deflector, is resiliently deformed so as to come into engagement in the bottoms of the various grooves already described and the corresponding surfaces of the deflector, so as finally to assume the configuration seen in FIG. 3. In this configuration, it can be seen that the pad 16, taken at the level of the swept surface 10, extends in a direction which is substantially parallel to the swept surface, so that in the event of there being any risk of contact of any part at all of the profiled portion 7, the free edge 13, or the zones 12 and 14, the pad 16 ensures that such contact will not take place while protecting the surface 10 against any damage.

Figure 5:
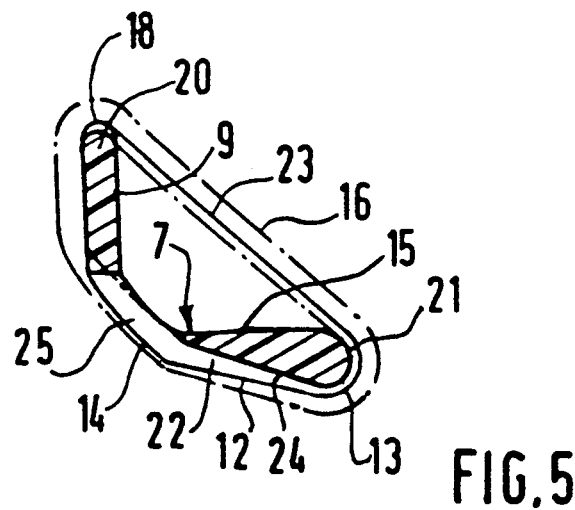
FIG. 5 is a view in cross section taken on the line 5—5 in FIG. 4.

Reference is now made to FIGS. 4 and 5, showing a first modified form of the mounting for the pad 16. The latter is indicated in these Figures only diagrammatically, for clarity. Also in these Figures, the same reference numerals have been used as in FIGS. 1 to 3 in order to assist understanding of the remainder of this description.

In FIGS. 4 and 5, the mounting or support element 19 includes a first groove 20, a second groove 21, both of which are identical to those in FIG. 3, and a third groove 22. The base 24 of the groove 22 is not parallel to the surface of the flat zone 12 as in FIG. 3, but instead converges towards the rear end of the outer surface 15 of the profiled portion 7 (i.e. towards the left in FIG. 5), in such a way as to enable an opening 25 to be formed in the second zone 14 of the profiled portion 7. The pad 16, which more particularly lies across this opening 25, is able to penetrate into the latter in such a way that it does not disturb the circulation of the air flowing behind the profiled portion 7.

In addition, a second web 26 is provided, having a shape and arrangement identical to those of the web 23 described above, and being situated at a distance from and parallel to the web 23 close to the other edge of the grooves. The annular pad 16 is thus held in its mounting element 19 firstly by the grooves 20 to 22 as described above, and secondly by the two webs 23 and 26, thus ensuring, apart from good positioning, protection for the pad itself.

Figure 6:
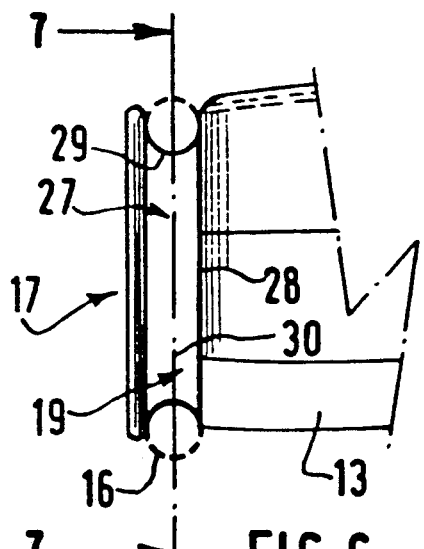
FIG. 6 shows a second variant on the detail D in FIG. 2.
Figure 7:
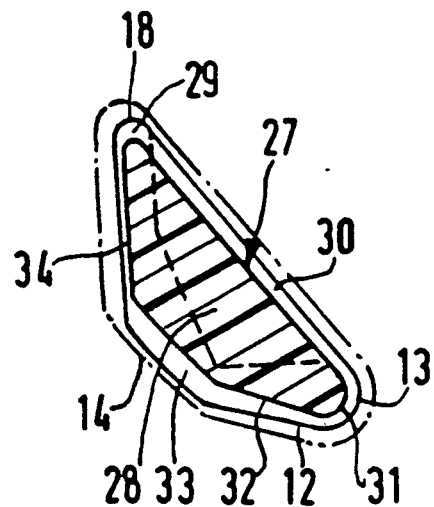
FIG. 7 is a view in cross section taken on the line 7—7 in FIG. 6.

FIGS. 6 and 7 show a second modification of the support element or mounting element 19 for the annular pad 16. In this case the element 19 consists of a single continuous groove 27, carried by a wall 28 which is arranged close to the end 17 of the deflector. This wall 28 is substantially trapezoidal in shape, and its transverse width is substantially the same as the transverse width of the deflector. Its continuous groove 27 comprises six groove parts (namely first to sixth groove parts) 29 to 34 respectively. The first, third and fourth groove parts 29, 31 and 32 respectively are substantially the same as the corresponding grooves 20, 21 and 22 respectively described above with reference to FIGS. 4 and 5. The second and fifth groove parts 30 and 33 correspond respectively to the longer parallel side and the shorter parallel side of the trapezium. The sixth groove part 34 joins the two groove parts 33 and 29 together. This arrangement retains the annular pad 16 in a continuous groove 27, and renders the use of a web unnecessary.

The present invention is not limited to the embodiments described, but embraces any variants; in particular, the annular pad may be in the form of an open loop secured to each free edge of the deflector.

In the case where the pad 16 is carried only by the profiled portion 7, the pad is then carried by the inner surface 11 of this profiled portion, so as to enclose the outer and inner free edges of the latter. Similarly, if the pad is carried by the connecting means 9 and the profiled portion 7, the pad engages on the inner surface 11 and the inner surface of the connecting means 9, to enclose the outer free edge 13 and the inner free edge 18 of the deflector.

What is claimed is:

1. An air deflector for a windshield wiper assembly operating over the windshield of a vehicle including a wiper arm and a wiper blade carried by said arm, the deflector comprising a profiled portion (7) and attachment means (8) for selectively attaching the deflector to said windshield wiper assembly, the profiled portion is formed with an inner convex surface (11) opposed to an outer concave surface (15), said inner convex surface facing said windshield and being provided with at least one groove, said deflector formed of rigid material and extending substantially parallel with said wiper blade over a major portion thereof to intercept the flow of air across the windshield, said deflector having a free edge (18) and an outer edge (13) spaced from the windshield, and a soft resilient flexible band serving as a buffer between the deflector and windshield looped around said deflector in at least one zone of said deflector parallel to said wiper blade which zone is a small fraction of the overall parallel extent of said deflector, said flexible band being supported in part by said free edge (18) and said outer edge (13) and received in said at least one groove.

2. An air deflector as claimed in claim 1 wherein said profiled portion comprises a first zone (12) overlying said windshield, a second zone (14) connected to said first zone and curving away from said windshield, a connecting web means (9) connected to said second zone at a location opposed to the connection to said first zone and extending in a generally perpendicular relationship with said windshield, attachment means (8) for connecting said connecting web means to said wiper assembly; and said first zone, said second zone and said connecting web means forming said outer concave surface (15) facing away from said windshield.

3. An air deflector as claimed in claim 2 wherein said flexible band comprises an O-ring stretched around said profiled portion to form a generally trapezium outline orthogonal to said deflector.

4. An air deflector as claimed in claim 3 including an O-ring at each end location of said profiled concave portion, each O-ring being supported by a groove (20) in said free edge (18), a groove (21) in said outer edge (13) and said groove (22) in said inner convex surface (11); and a trapezium-shaped web (23) closing off each outer end of said profiled concave portion, the longest side of each trapezium-shaped web having a groove extension in alignment with said surface grooves (20, 21, 22) in said profiled concave portion.

5. An air deflector as claimed in claim 4 wherein said trapezium shaped web is thickened and provided with a semicylindrical groove in its longest wall in alinement with said surface grooves to support said O-ring.

6. An air deflector as claimed in claim 3 wherein said at least one groove (22) in said inner convex surface (11) extends in part through the second zone (14) to be recessed therein.

7. An air deflector according to claim 1 wherein said resilient flexible band looped around said free edge and said outer edge is circular in cross section whereby the frictional contact between the band and windshield is at a minimum.

8. An air deflector according to claim 7 wherein said resilient flexible band comprises an O-ring.

9. An air deflector according to claim 8 wherein the free edge and the outer edge (13) of said deflector are provided with semicylindrical grooves (20, 21) to receive said O-ring with a portion of said O-ring projecting out of the outer free edge groove (21) to serve as said buffer.

10. An air deflector as claimed in claim 1 including at least two spaced resilient flexible bands.

* * * * *